United States Patent [19]

Cummins

[11] Patent Number: 5,442,355
[45] Date of Patent: Aug. 15, 1995

[54] SYSTEM FOR DEVELOPING CRT COLOR-INTENSITY CONTROL SIGNALS IN HIGH RESOLUTION CRT DISPLAY EQUIPMENT

[75] Inventor: Timothy J. Cummins, Limerick, Ireland

[73] Assignee: Analog Devices, Inc., Norwood, Mass.

[21] Appl. No.: 151,946

[22] Filed: Nov. 15, 1993

Related U.S. Application Data

[60] Division of Ser. No. 79,641, Jun. 18, 1993, which is a continuation of Ser. No. 649,433, Feb. 1, 1991, abandoned.

[51] Int. Cl.$^6$ .................................................. H03M 1/68
[52] U.S. Cl. .................................................... 341/145
[58] Field of Search ............... 341/145, 153, 136, 133, 341/134, 135, 144

[56] References Cited

U.S. PATENT DOCUMENTS

| | | | |
|---|---|---|---|
| 3,611,353 | 10/1971 | Shipp et al. | 341/119 |
| 4,016,555 | 4/1977 | Tyrrel | 341/145 |
| 4,096,475 | 6/1978 | Ong | 341/145 |
| 4,827,260 | 5/1989 | Sugawa et al. | 341/145 X |
| 5,017,919 | 5/1991 | Hull et al. | 341/136 |
| 5,057,838 | 10/1991 | Tsuji et al. | 341/133 |
| 5,294,927 | 3/1994 | Levinson et al. | 341/145 X |

FOREIGN PATENT DOCUMENTS 0090965 4/1988 Japan.

*Primary Examiner*—Brian K. Young
*Attorney, Agent, or Firm*—Parmelee, Bollinger & Bramblett

[57] ABSTRACT

CRT control apparatus for use in high-resolution graphic display equipment of the type including a frame buffer having storage banks for storing digital signals representing the color intensities of red, green and blue colors of pixels on the CRT screen. The control apparatus is formed in a single MOS integrated-circuit (IC) chip which incorporates three multiplexers for the three 8-bit sets of color digital signals from the frame buffer. The 8-bit outputs of the multiplexers are directed to digital-signal-transformation devices which, in response to each 8-bit signal, produce a corresponding 10-bit signal incorporating the color-intensity information of the original 8-bit signal, and also incorporating a gamma correction factor for the particular intensity represented by the original 8-bit signal. The 10-bit signals are directed to 10-bit DACs, one for each color, to produce corresponding analog control signals for the corresponding electron guns of the CRT. The 10-bit DACs include unique arrangements to minimize differential non-linearity and glitch energy at critical digital code transitions.

21 Claims, 8 Drawing Sheets

(GAMMA EQUALS 2.7)

| 8-BIT DATA | GAMMA CORRECTED | QUANTISED TO 8-BITS | QUANTISED TO 10-BITS |
|---|---|---|---|
| 240 | 0.977797 | 250 | 1001 |
| 241 | 0.979304 | 250 | 1002 |
| 242 | 0.980807 | 251 | 1004 |
| 243 | 0.982306 | 251 | 1005 |
| 244 | 0.983801 | 251 | 1007 |
| 245 | 0.985292 | 252 | 1008 |
| 246 | 0.986780 | 252 | 1010 |
| 247 | 0.988264 | 252 | 1011 |
| 248 | 0.989744 | 253 | 1013 |
| 249 | 0.991220 | 253 | 1015 |
| 250 | 0.992693 | 254 | 1016 |
| 251 | 0.994161 | 254 | 1018 |
| 252 | 0.995626 | 254 | 1019 |
| 253 | 0.997088 | 255 | 1021 |
| 254 | 0.998546 | 255 | 1022 |
| 255 | 1.000000 | 255 | 1023 |

SYSTEM FOR DEVELOPING CRT COLOR-INTENSITY CONTROL SIGNALS IN HIGH RESOLUTION CRT DISPLAY EQUIPMENT

This application is a divisional application of application Ser. No. 08/079,641 as filed on Jun. 18, 1993 which is a continuation of application Ser. No. 07/649,433 as originally filed of Feb. 1, 1991, now abandoned.

BACKGROUND OF THE INVENTION

1. Field of the Invention

This invention relates to high-resolution display apparatus utilizing a cathode ray tube (CRT) for presenting color graphics. More particularly, this invention relates to such apparatus wherein the CRT control data is stored in digital format and is converted to analog format for controlling the CRT electron beam guns.

2. Description of the Prior Art

Systems for producing high-resolution displays on CRTs, such as for computer graphics displays, commonly develop the picture control data in digital format. Such data is stored in a so-called frame buffer comprising a large number of random-access-memory devices (Video RAMs) arranged to provide a large number of storage banks for respective CRT pixel signals. The frame buffer is controlled by a graphics processor which directs the transfer of data to and from the frame buffer in properly synchronized fashion. The digital data read-out from the frame buffer is directed to a set of digital-to-analog converters which produce corresponding analog signals for respective color guns of the CRT, thereby to control the intensity of each color (red, green, blue) for each pixel of the CRT display.

One of the problems encountered in achieving high performance in CRT displays is caused by the non-linear "transfer function" between corresponding electrical and optical quantities in both the camera and the receiver. For example, in a typical color receiver, the light-output of each phosphor follows a power-law relationship to the video voltage applied to the grid or cathode of the CRT. Consequently, the human eye's perception of incremental changes in light intensity is non-linear, such that the eye perceives a given increment of intensity signal change as a function of the level of the intensity signal. The red intensity, for example, produced on a monitor screen by a red input value of $R_i$ is:

$$R_m = (R_i)^{\gamma r}$$

where $\gamma_r$ is normally in the range of 2.3–2.8. If $\gamma_r$, $\gamma_g$ and $\gamma_b$ (i.e., gamma red, gamma green and gamma blue) are known, then a so-called gamma correction can be applied, as in the following relationship:

$$R_i' = k(R_i)^{1/\gamma_r}$$

Prior art systems have incorporated means to apply such gamma correction. However, in those systems, gamma correction generally was achieved at the price of a reduction in the resolution and dynamic range of the color intensity control signals, thus preventing the achievement of really high-quality high-resolution display systems. Moreover, the gamma correction and associated circuitry was unsuitably organized, e.g., so as to require a plurality of separate interconnected components, excessive IC chip area, and so on. Consequently, there has developed a pressing need for improved CRT control systems which avoid the disadvantages of prior art systems.

SUMMARY OF THE INVENTION

In a preferred embodiment of the invention, to be described in detail hereinbelow, there is provided a CRT control apparatus for use in high-resolution CRT display equipment of the type comprising a frame buffer having a number of storage banks for storing digital signals representing the colors of corresponding pixels on the CRT. In such equipment, the frame-1-buffer typically is basically controlled by a so-called graphics processor which among other things continuously updates the stored digital signals in the buffer to provide for presenting successive display frames on the CRT. The frame buffer in such equipment commonly includes a serial read-out port for transferring in serial fashion successive parallel-formatted digital control signals from the buffer storage banks to a CRT control system having means or creating analog control signals for controlling the intensities of the electron beams from the color guns of the CRT.

In the embodiment described, a single MOS integrated-circuit (IC) chip is formed with circuit means for carrying out the functions of the CRT control system. This MOS chip incorporates transistor circuit means not only for developing the analog signals for the CRT color guns, but additionally includes means for controlling the amplitudes of the analog signals in such a way as to automatically introduce a proper gamma correction for linearizing the perception of colors by the human eye, without degrading in any way the resolution and dynamic range of the color gun intensity control function.

For achieving this result, the MOS chip is formed with a set of three digital-signal-transformation devices each including means to receive an 8-bit digital color control signal (red, green or blue) derived from the serial read-out port of the frame buffer. Each of these devices temporarily stores the 8-bit digital color control signal and uses it as an address to locate a corresponding 10-bit color control signal. This 10-bit color control signal fully identifies the color intensity represented by the original 8-bit control signal, and further identifies an additional intensity correction factor for effecting linearization of the human eye's perception of the particular color gun intensity identified by the original 8-bit signal.

The resultant 10-bit digital control signal is directed to a respective one of three 10-bit digital-to-analog converters (DACs) which are formed as part of the MOS IC chip, and which produce corresponding analog control signals for the color guns of the CRT. These analog control signals include the original full-range color intensity information, and also the proper gamma correction for each such level of intensity. Thus, the CRT color guns are controlled in such a way so as to significantly enhance the high-resolution quality of the graphic presentation, thereby enabling display of photorealistic quality images and true color representation of such images as three-dimensional curved and shaded surfaces.

In accordance with a further aspect of the invention, the three 10-bit DACs are arranged in a unique fashion so as to improve their differential non-linearity, and also to reduce the glitch energy developed in carrying out critical digital signal transitions. These results moreover are achieved without any significant increase in the chip area required for the transistors forming the 10-bit DACs.

Accordingly, it is an object of the present invention to provide gamma correction in a digitally-controlled high-definition CRT display without loss of resolution and dynamic range. Another object of the present invention is to provide on a single integrated-circuit (IC) chip all of the necessary digital conversion functions together with proper gamma correction means suitable for use with high-resolution CRT displays. Other objects, aspects and advantages of the invention will in part be pointed out in, and in part apparent from, the following description of a preferred embodiment of the invention, considered together with the accompanying drawings.

DESCRIPTION OF A PREFERRED EMBODIMENT

Figure 1:
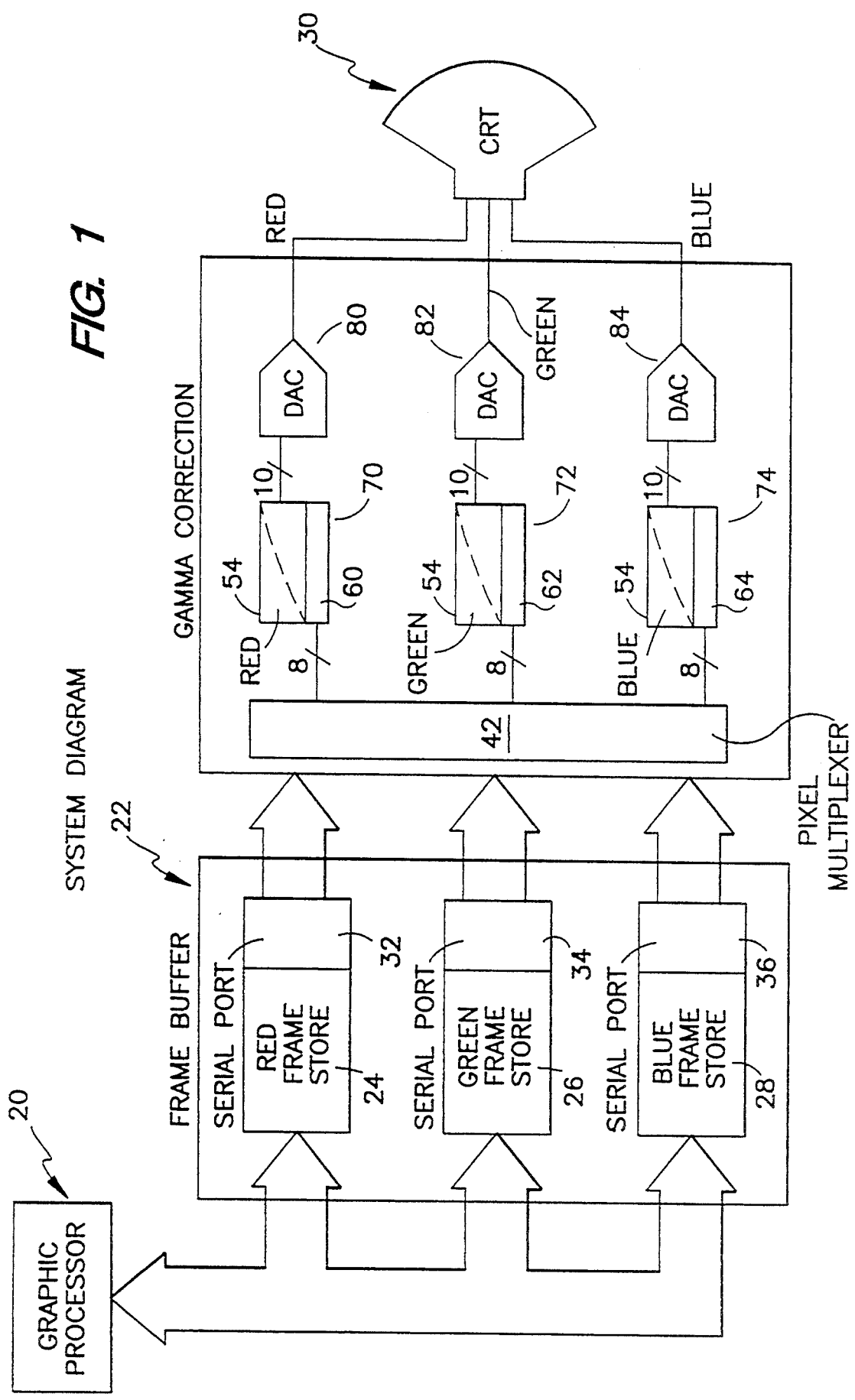
FIG. 1 is a block diagram showing the arrangement of the CRT control portion of a high-resolution color graphics display system incorporating the present invention.

Referring first to FIG. 1, there is shown in broad outline a CRT control system for a high-resolution color graphics display system of the type including a graphic processor 20. This processor comprises digital processing apparatus of known type for performing many of the required system functions, including that of directing the flow of digital color-intensity signals to a so-called frame buffer 22 of conventional construction. The frame buffer shown in FIG. 1 includes red, green and blue frame stores 24, 26 and 28, containing all of the color signal data for display of a complete frame on the CRT (indicated at 30). These frame stores include a large number of storage banks storing the digital color signals for the 3-color "pixels" of the CRT display.

Color signal data from the graphics processor 20 updates the frame buffer 22 essentially continuously so that the buffer always contains current signal information defining all of the color pixels of a complete frame. The system illustrated in FIG. 1 is a "true color" system, with separate channels for red, green and blue color control signals, and wherein the stored signal data directly identifies by corresponding codes the intensity of each color of each pixel. Features of the invention are however applicable to so-called color indexing systems as well, wherein the stored signal data in the frame buffer instead identifies an index or pointer to the color intensity data rather than storing the actual color intensity data itself.

Each frame store 24, 26, 28 includes a serial port 32, 34, 36 which comprises a shift register operable at high speed. The complete contents of one row of signal data (e.g., for one horizontal line of the CRT) can be dumped into the shift register during one cycle of the frame buffer and then shifted out serially at high speed, independently of the frame buffer functioning, in order to effect periodic refreshing of the CRT display, for example, at 60 Hz.

Figure 2:
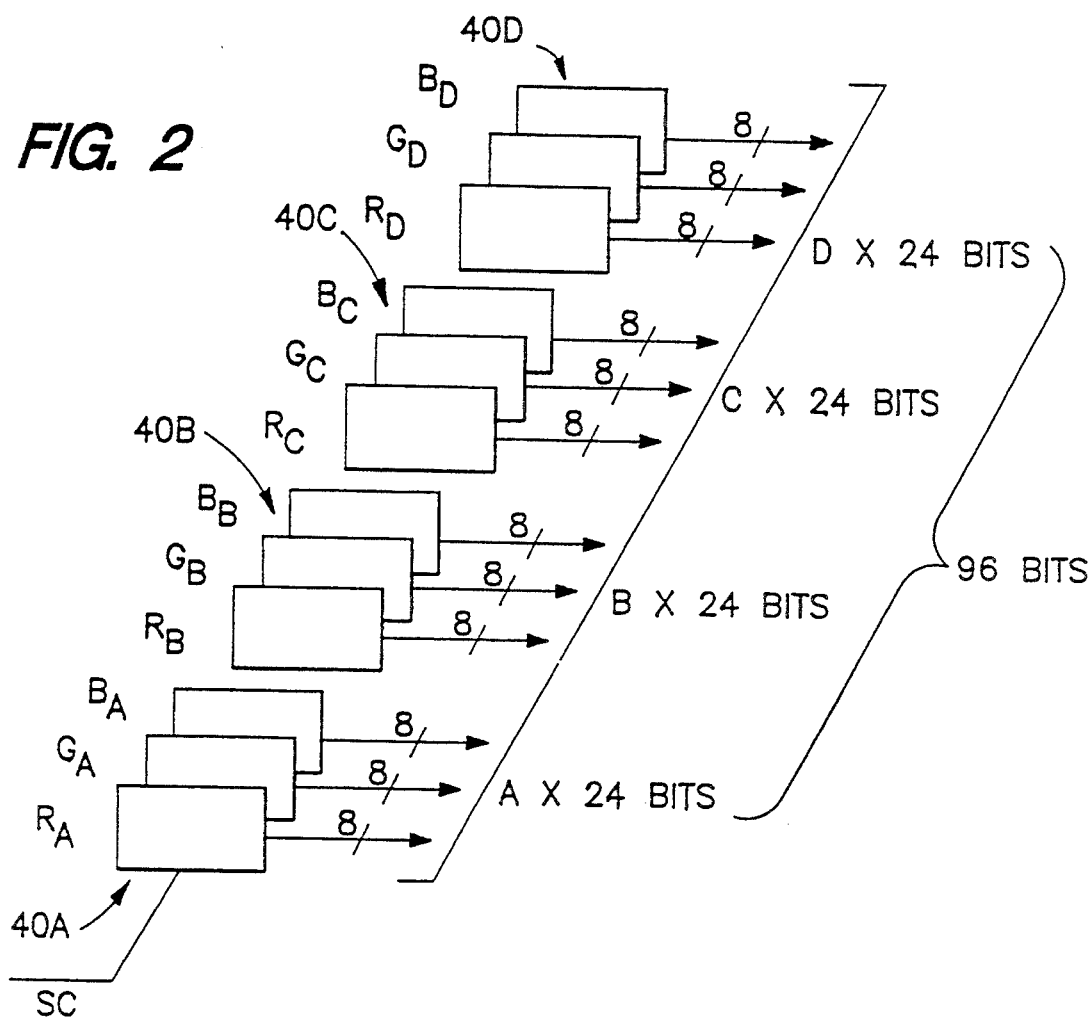
FIG. 2 is a perspective block diagram pictorially illustrating aspects of the frame buffer.
Figure 3:
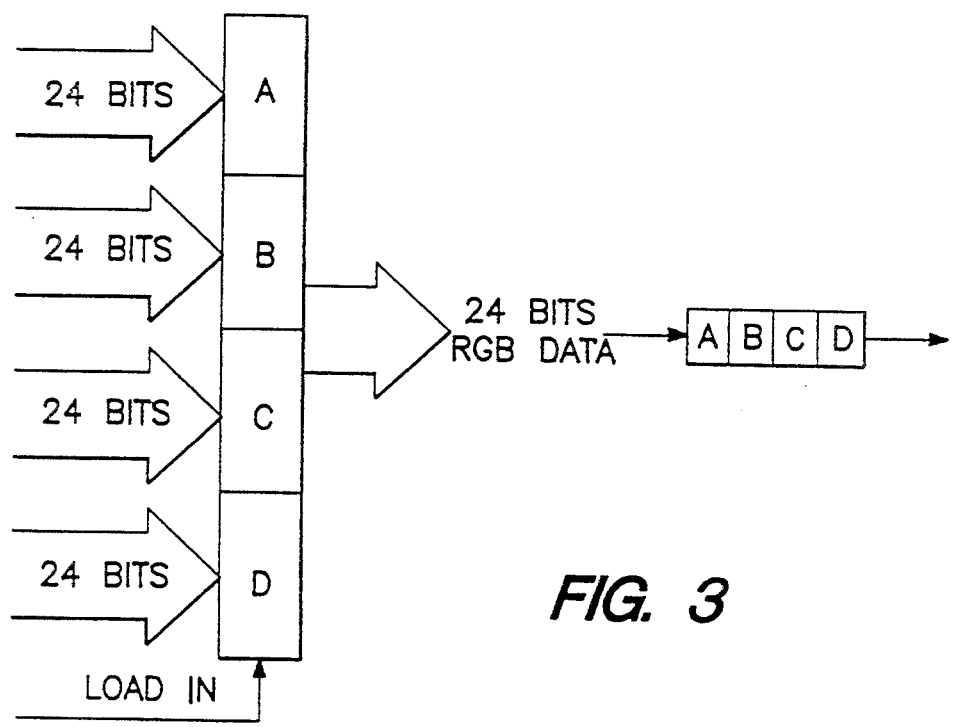
FIG. 3 is a block diagram illustrating aspects of the pixel signal multiplexing function.

Referring now also to FIGS. 2 and 3, the frame buffer read-out function is shown pictorially for a group of four successive 3-color pixels to be presented on the CRT. The pictured arrangement comprises four sets of storage devices 40A–40D each including three storage elements ($R_A$, $G_A$, $B_A$, etc.) for storing the three color-data signals for the three colors (red, green, blue) for a corresponding pixel of the CRT display. If the color-data signals are of 8-bit resolution (i.e., providing 256 intensity levels), then the outputs of the storage devices for each 3-color pixel will have 24 bits. For a 4:1 multiplexing system (as will be described), read-out of all four storage devices 40A–40D will be effected simultaneously, to transfer 96 bits at a time, in parallel format.

The total number of pixel storage banks needed in the frame buffer 22 depends upon the resolution of the CRT. For example, for the fairly common arrangement of 1024 pixels per horizontal line, and 768 lines per frame, a total of 786,432 pixel storage banks would be needed to store all of the 3-color pixel signals for the CRT. The storage banks can be organized in various configurations, now well known in the art. For example, the signals for any one color can be stored in a group of so-called bit-planes, 1024 bits wide by 768 down, with 8 planes per group, thereby providing an 8-bit signal for one color of each pixel. Three such groups of bit-planes would be needed for all three colors.

When all four sets of storage devices 40A–40D are read-out at the same me, the resulting 96 bits are simultaneously loaded in registers A, B, C, D, as shown in FIG. 3, and which store the signals in parallel format. A pixel multiplexer 42 (see FIG. 1) scans these registers in sequence to produce a serial flow of RGB color signals (A, B, C, D), as shown in FIG. 3. For example, 96-bit "packages" might be loaded into the registers at a 25 MHz clock rate (the frame buffer clock rate), and thereafter scanned out at an accelerated 100 MHz clock rate synchronized with the CRT Video clock.

As mentioned briefly hereinabove, one of the problems in high-resolution CRT display apparatus is that presented by the non-linear CRT eye-response characteristic sometimes referred to as the gamma function.

Figures 4, 5:
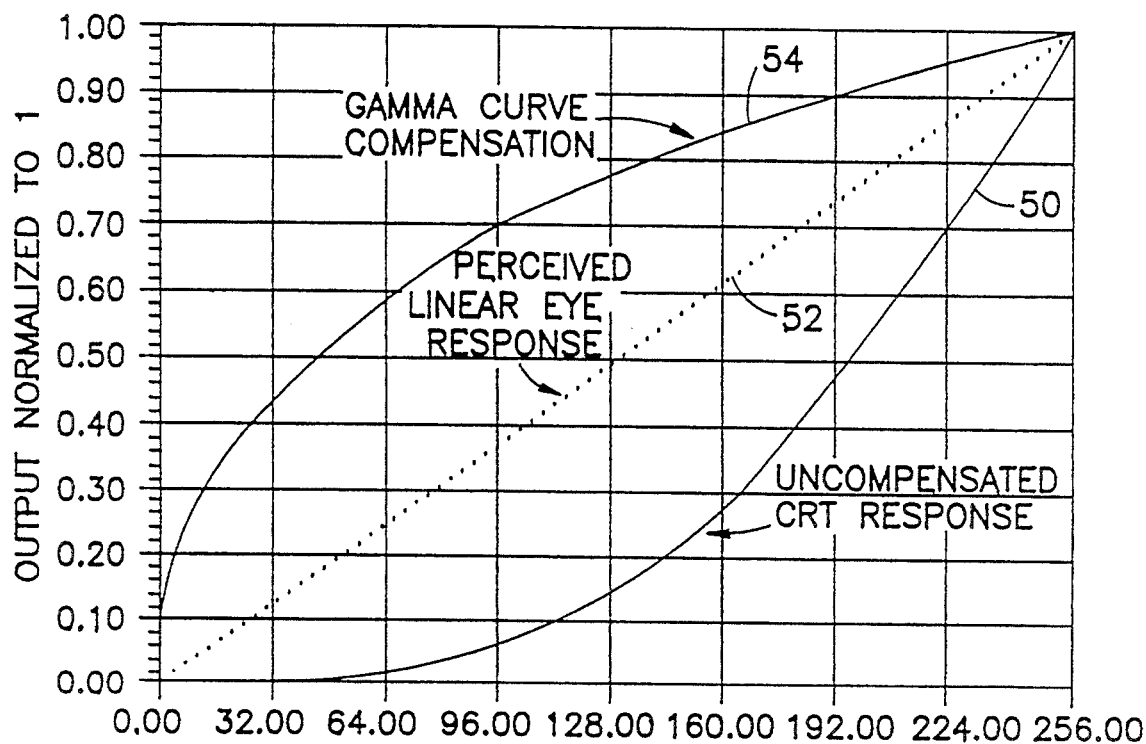
FIG. 4 is a graph illustrating the non-linear characteristics of the gamma transfer function and proper compensation therefor.
FIG. 5 is a table showing a group of 8-bit digital color-intensity codes with gamma correction at 8-bit and 10-bit quantizations.

This characteristic is represented in FIG. 4 by the lower solid line 50. To achieve a linear response as perceived by the eye, as indicated by the dotted line 52, the CRT control signals must be altered in accordance with a gamma compensation characteristic as shown by the upper solid line 54. The apparatus now to be described achieves that result in an advantageous fashion.

Referring again to FIG. 1, the pixel multiplexer 42 distributes the scanned 8-bit color signals to corresponding red, green and blue color channels. Each 8-bit color signal is in sequence loaded into a receiving port 60, 62, 64 forming part of a respective digital-signal-transformation device generally indicated at 70, 72, 74, including means for storing a number of 10-bit data signals. Each loaded 8-bit color signal is used in parallel format as an addressing signal to identify the location of a corresponding 10-bit-wide storage segment in the devices 70–74.

Each such addressable storage segment contains a pre-stored 10-bit data signal corresponding to the 8-bit color signal loaded into the receiving port. That is, each device 70, 72, 74 functions in the manner of a look-up table or an arithmetic encoder to produce a 10-bit parallel-formatted data signal corresponding to the applied 8-bit color signal. The 10-bit signal incorporates the color-intensity information of the original 8-bit color signal, and also includes an additional intensity correction factor for effecting linearization of the human eye's perception of the particular color gun intensity identified by the original 8-bit signal. Using an 8-bit signal for addressing purposes, 256 pre-stored 10-bit data signals can be accessed.

The additional 2-bits of information available in each pre-stored 10-bit signal make it possible to provide properly for gamma correction of the original 8-bit color signal. That is, the 10-bit digital number identifies a corresponding color intensity which is based on the original 8-bit color intensity level, but modified in accordance with the gamma compensation function as represented by the line 54 on the graph of FIG. 4. The degree of modification of the original 8-bit color intensity signal is a function of the intensity level of the original 8-bit signal. The 10-bit signal provides a resolution of the final output that is greater than the resolution of the original 8-bit signal. The end result is to produce color intensity signals capable of developing a very nearly linear eye-perception characteristic as shown by the dotted line 52.

The table of FIG. 5 demonstrates an important advantage of the digital-signal transformation devices 70–74 described above. The left-hand column of this table presents a sequential series of code values representing 8-bit color-intensity signals. The next column lists the gamma correction required for each of these coded values. Next is a column showing the original 8-bit color-signal data with a corresponding gamma correction, and presented with 8-bit quantization. The last column shows the original 8-bit color signal data, with gamma correction but presented with 10-bit quantization.

It will be seen that the column of gamma corrected numbers based on 8-bit quantization has the disadvantage of including a number of identical output signal levels. If these signals were then presented via digital-to-analog converters to a CRT, it would mistakenly display the same color intensity for each of those identical signal levels whereas the corresponding original data were different. This would result in the final image displayed on the CRT suffering from both a reduction of resolution and also having distinct errors in the intensities being displayed. Prior art systems which have attempted to implement gamma correction as hereinabove described have failed to achieve true three-dimensional image rendition due t these errors, which can noticeably be seen as "banding" on a curved surface, such as the display of a billiard ball on the CRT. This is a long-standing and well known problem in the computer graphics industry; many solutions have been tried, such as software "dithering" or image post-processing, with little or no success, due to the huge software overhead required.

The gamma corrected numbers based on the 10-bit quantization column of FIG. 5, however, do not suffer from these errors because the problem of identical value intensity levels for different corresponding data inputs does not exist, so that the image of a billiard ball, for example, would have no "banding", but smooth intensity transitions the whole way around its surface. Thus by the use of digital signal transformation together with digital-to-analog converters, the present invention makes possible for the first time true color photographic quality image rendition on high resolution CRT graphics displays operating at frequencies of 70 MHz-and above.

The 10-bit gamma-corrected data signals from the signal-transformation devices 70, 72 and 74 are directed to corresponding 10-bit DACs 80, 82, 84. These DACs convert each 10-bit signal to a respective analog intensity control signal for one of the three color electron guns of the CRT 30. The application of these analog signal to the control electrodes of the respective gun is synchronized with the movement of the beam raster across the face of the CRT.

The DACs 80–84 are specially configured to assure excellent performance with only modest chip area requirements. In more detail now, and referring to FIG. 6, there is shown in diagrammatic format aspects of a 10-bit DAC supplied with bit control signals D0 to D9 for turning on and off current sources as generally indicated in the upper portion of the figure. The current-generating control circuitry is divided into three sections, one section 90 for a higher-order group of bits (D6–D9), a second section 92 for a middle-order group of bits (D4, D5), and a third section 94 for a lower-order group of bits (D0–D3). All of these sections comprise MOS current sources 96 of the type shown in FIG. 7.

The current sources 96 are differentially operable, using both the principal control signal "DATA" and its complement to control the two differential switch transistor 98, 100. Differential switching is superior to single-ended switching for multiple DACs on a single IC chip because the latter's common reference line for the single-ended switches couples noise between the three DACs.

Figure 6:
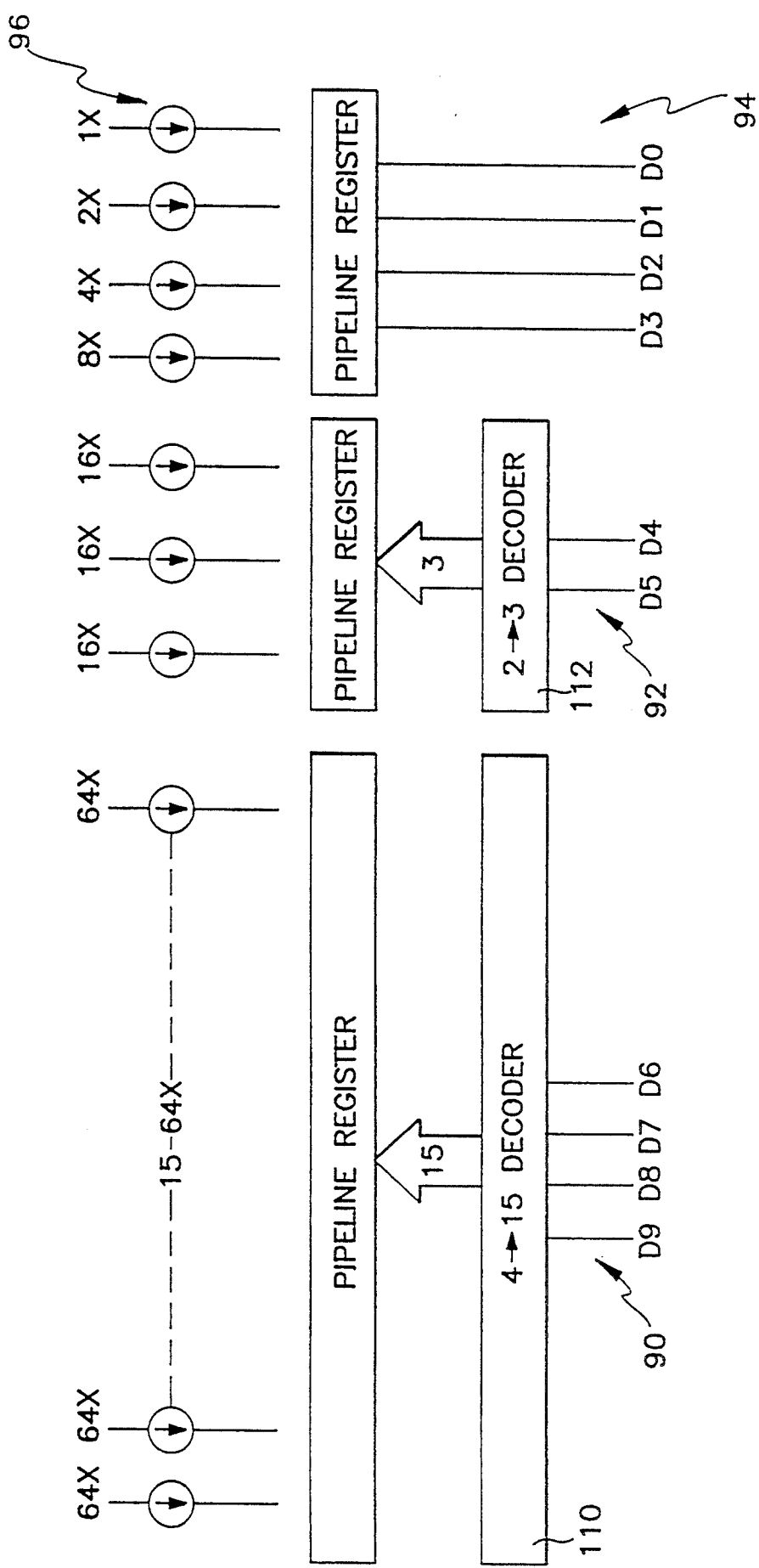
FIG. 6 is a diagrammatic representation of a 10-bit digital-to-analog converter (DAC) as used in the preferred embodiment of the invention.
Figure 7:
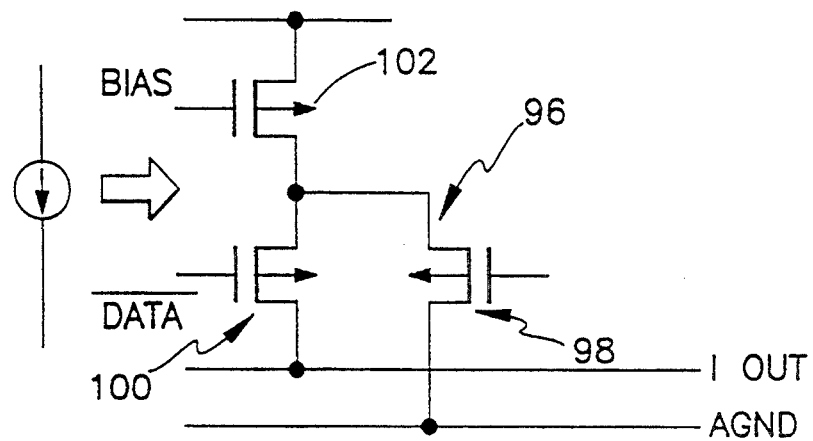
FIG. 7 shows details of the type of current source used in the DAC of FIG. 6.

The magnitude of current of each source 96 is determined by the electrode area of the particular source transistor 102. The relative areas are indicated in FIG. 6 as multiples of the least significant bit area 1X.

For the higher-order bits D6–D9, there are fifteen current sources all of 64X magnitude, controlled by the fifteen outputs of a conventional 4:15 fan-out decoder 110. The middle-order bits D4, D5 control three 16X current sources by the outputs of a 2:3 fan-out decoder 112 of known construction. The lower-order bits D0–D3 control respective weighted current sources sized to match the individual bit order, i.e., 8X, 4X, 2X and 1X.

The three 10-bit DACs 80–84 provide superior differential-nonlinearity (DNL) and reduced glitch energy, both very particularly important for video DACs. This improvement is moreover achieved without any significant increase in chip area. One important aspect of the new DAC arrangement is the establishment of the separate middle-order bit control section 92 employing a fan-out decoder 112 (in this case; for the middle bits D4, D5).

Figure 8:
FIG. 8 is a table showing current source switching patterns for a sequence of codes for the lower-order 6 bits of a 10-bit digital signal.

In more detail, and referring to FIG. 8, in a conventional weighted arrangement (1X, 2X, 4X, 8X, 16X, 32X) as represented by the center column of the table, and considering particularly the critical transition from code 011111 to code 100000, the lower five sources will switch off, and the sixth source will switch on. Therefore, at the transition, a current of 32X will go in one direction, and a current of 31X will go in the opposite direction.

In the new arrangement (right-hand column), for this transition the lower four bit sources (1X, 2X, 4X, 8X) will switch off (as before), but only one 16X source will switch from "off" to "on". Thus, one 16X remains "on" under both code conditions, so that only half the amount of current is switched for this critical code transition than in the conventional arrangement. Thus the glitch energy is halved for this particular transition.

That same transition, from 011111 to 100000, is also critical for differential-nonlinearity (DNL). Because in the conventional arrangement one 32X current source switches on, while all of the other five switch off, any mismatch between the 32X current magnitude and the sum of all the other five currents will cause a DNL error. With the new architecture (the right-hand column), only one 16X source switches "on", while the lowest four (8X, 4X, 2X, 1X) switch "off". One 16X remains on at all times. Thus only a mismatch between a 16X source and the sum of the four lowest sources (8X–1X) can cause a DNL error. Such matching is more readily obtained than in the conventional switching arrangement.

Figure 9:
FIG. 9 is a table showing current source switching patterns for bits 4 and 5 (1.e., the middle two bits of a 10-bit signal)

FIG. 9 illustrates another way of looking at this switching transition. Considering now only the middle bits (Nos. 4 and 5), and only the transition from 01 to 10, with the conventional arrangement the 32X source switches "on" and the 16X switches "off". In the new architecture, the same transition results only in one 16X current source switching "on". This produces guaranteed monotonic behavior and better DNL for these two bits, leading to an improvement in overall DNL for the entire DAC.

Accordingly, by employing a fan-out decoder for a middle set of bits (specifically, in the preferred embodiment, bits 4 and 5), an important improvement in glitch energy and DNL has been achieved at the expense only of 4 additional transistors for the decoder. These additional transistors require only an essentially insignificant increase in chip area.

Figure 10:
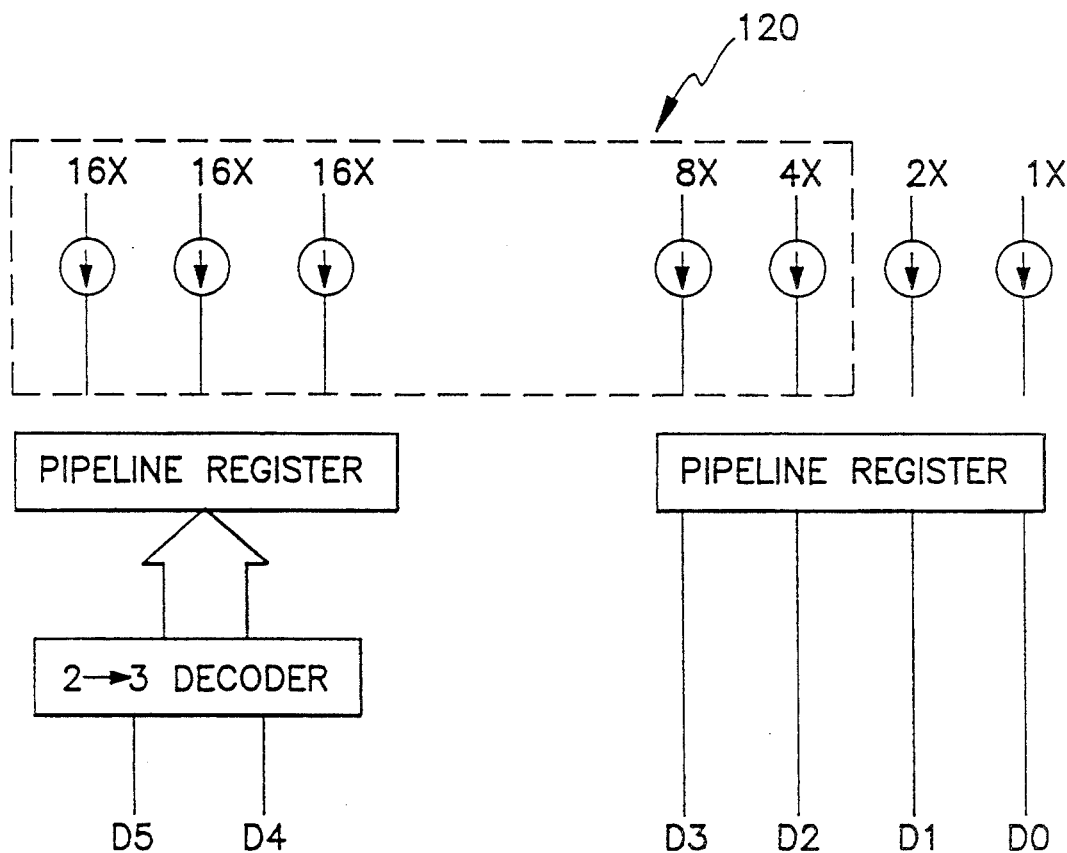
FIG. 10 is a diagram illustrating aspects of the current source layout for the DAC of FIG. 6.
Figure 11:
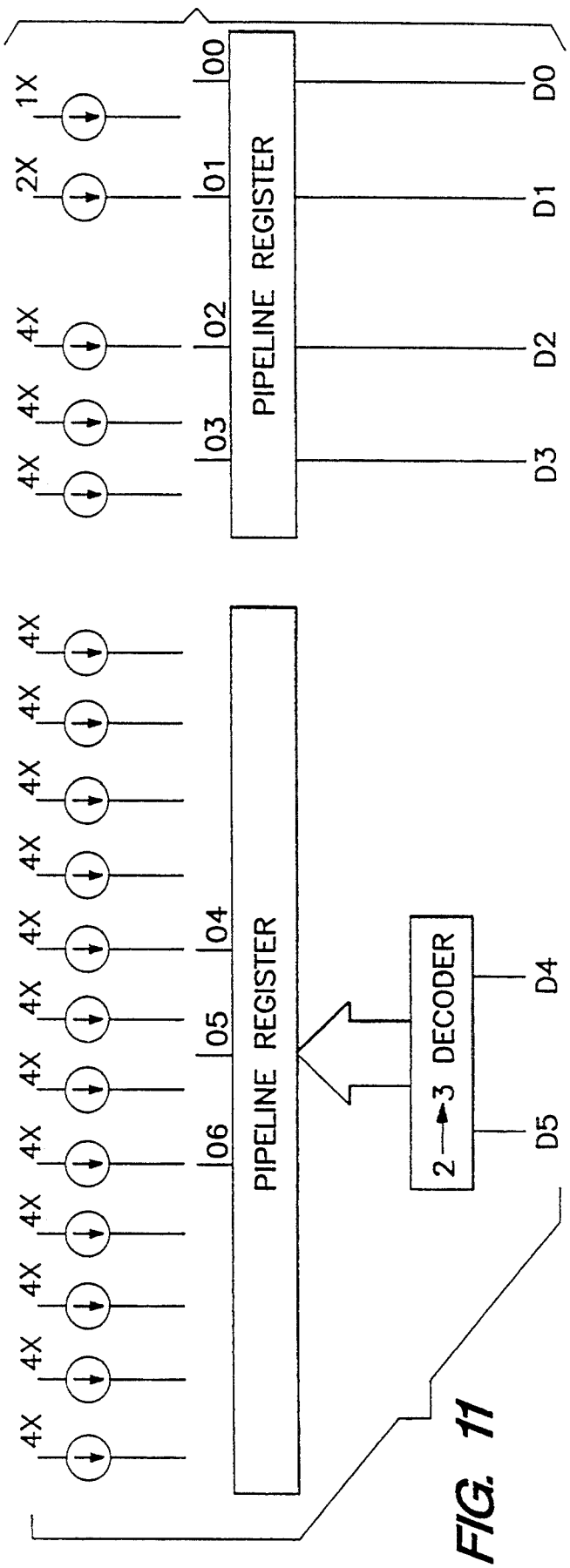
FIG. 11 provides further details for the layout arrangement of FIG. 10.

The physical layout of the current sources 96 also is designed to improve linearity and decrease glitch energy. Referring to FIG. 10, showing the bottom six bits, a dotted line enclosure 120 indicates a set of current sources which, in the actual physical layout, are made up of equal-area 4X sources which are grouped together on the chip. FIG. 11 shows further details of this current-source arrangement, where it will be seen that each of the three 16X sources (FIG. 10) consists of four 4X paralleled sources, and that the 8X source consists of two paralleled 4X sources.

Figure 12:
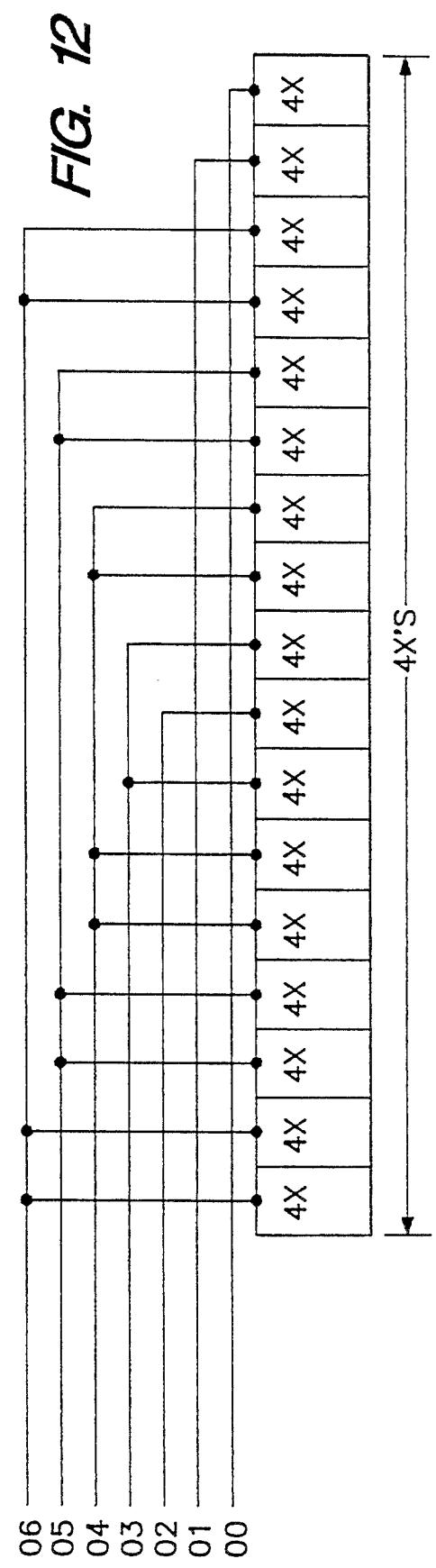
FIG. 12 is a pictorial representation of the layout arrangement of FIG. 11, for the lower 6 bits of the DAC.

Thus the entire set of sources within the dotted enclosure 120 is made up of 15 identical 4X sources. The layout of these latter sources is shown in FIG. 12. It may particularly be noted that with this arrangement, the control gate leads for the sources numbered 02 to 06 are symmetrically configured about the eighth 4X current source, counting from either end of the set of 15 sources.

Figure 13:
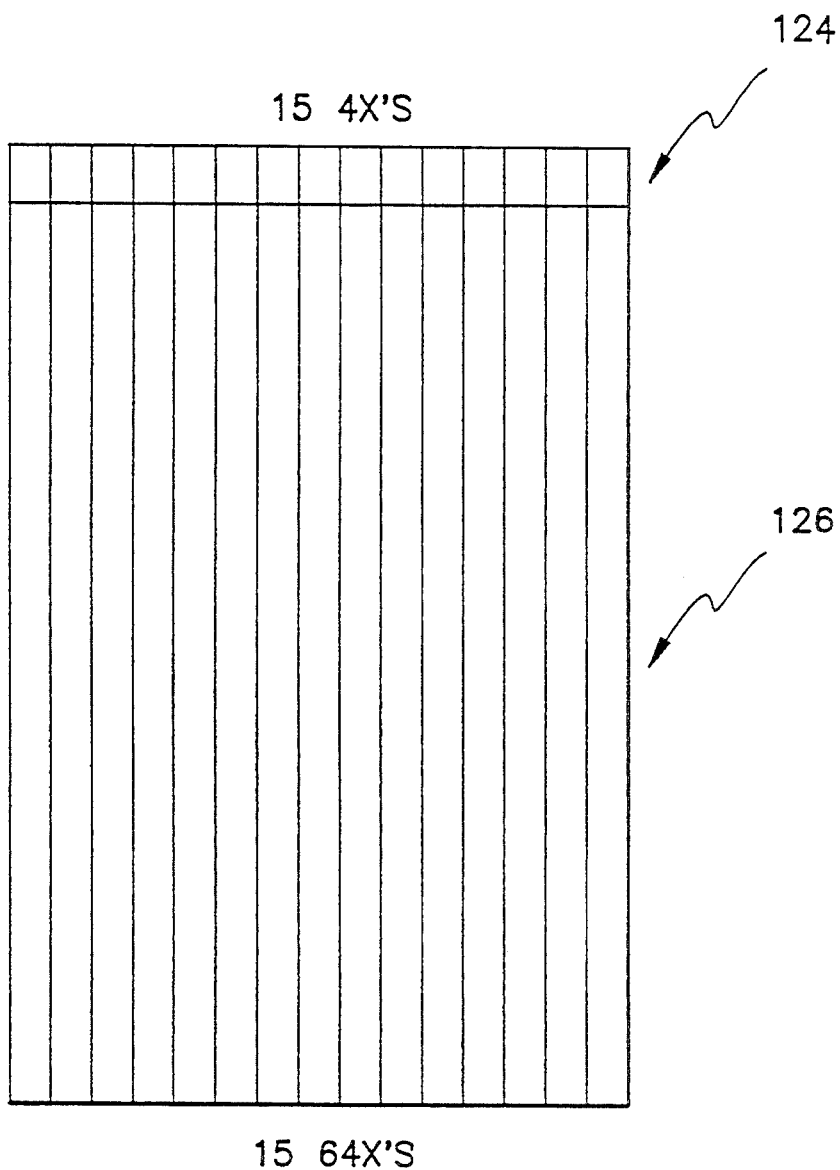
FIG. 13 is a diagrammatic showing of the current source layout arrangement of the complete 10-bit DAC.

With 15 current sources of 4X area, economy and regularity of required chip area can be achieved in a 10-bit DAC as described, because the four higher order bits also require 15 separate current sources. As shown in FIG. 13, both sets of 15 current sources can be laid out side-by-side, the lower-order group 124 having widths corresponding to 4X electrode areas, and the higher-order group 126 having widths 16 times as great, to provide electrode areas corresponding to 64X. The very small 2X and 1X current sources can conveniently be tucked in at one corner of the complete array without causing any real interference with the overall pattern.

Although a preferred embodiment of the invention has been disclosed herein in detail, it is to be understood that this is for the purpose of illustrating the invention, and should not be construed as necessarily limiting the scope of the invention since it is apparent that many changes can be made by those skilled in the art while still practicing the invention claimed herein.

What is claimed is:

1. An integrated-circuit (IC) chip formed with three digital-to-analog converters (DACs) for developing video analog signals to be directed to respective color guns of a CRT, said DACs each comprising:
   a plurality of current sources;
   first, second and third switch control means for switching the currents of said current sources from one to the other of two lines;
   said first switch control means receiving a set of higher-order bit signals;
   said second switch control means receiving a set of middle-order bit signals;
   said third switch control means receiving a set of lower-order bit signals;
   circuit means for developing composite analog output signals for each of said DACs to enable said analog output signals to be directed to respective CRT color guns;
   said second switch control means comprising a fan-out decoder responsive to said middle-order bit signals and having outputs for controlling said middle group of said current sources;
   said middle group of current sources all having equal currents.

2. Apparatus as claimed in claim 1, wherein said third switch control means includes means to switch the corresponding lower-order group of current sources individually in accordance with said lower-order set of bit signals respectively;
   the currents of said lower-order group of current sources being weighted in accordance with the order of the corresponding bit signal.

3. Apparatus as claimed in claim 2, wherein the middle-order bit signals comprise only two bits.

4. Apparatus as claimed in claim 3, wherein said set of lower-order bit signals consists of the lowest-order four bits.

5. An integrated-circuit (IC) chip formed with three digital-to-analog converters (DACs) for developing video analog signals to be directed to respective color guns of a CRT, said DACs each comprising:
- a plurality of current sources;
- first, second and third switch control means for switching the currents of said current sources from one to the other of two lines;
- said first switch control means receiving a set of higher-order bit signals;
- said second switch control means receiving a set of middle-order bit signals;
- said third switch control means receiving a set of lower-order bit signals;
- circuit means for developing composite analog output signals for each of said DACs to enable said analog output signals to be directed to respective CRT color guns;
- said set of higher-order bit signals consisting of four bits;
- said set of middle-order bit signals consisting of two bits; and
- said set of lower-order bit signals consisting of four bits.

6. Apparatus as claimed in claim 5, wherein said first switch control means comprises a 4:15 fan-out decoder to provide for switching any one of 15 current sources.

7. Apparatus as claimed in claim 5, wherein said second switch control means comprises a 2:3 fan-out decoder to provide for switching any one of 3 current sources.

8. An integrated-circuit (IC) chip formed with three digital-to-analog converters (DACs) for developing video analog signals to be directed to respective color guns of a CRT, said DACs each comprising:
- a plurality of current sources;
- first, second and third switch control means for switching the currents of said current sources from one to the other of two lines;
- said first switch control means receiving a set of higher-order bit signals;
- said second switch control means receiving a set of middle-order bit signals;
- said third switch control means receiving a set of lower-order bit signals;
- circuit means for developing composite analog output signals for each of said DACs to enable said analog output signals to be directed to respective CRT color guns;
- said current sources being arranged in first, second and third groups, said first group being controlled by said higher-order bit signals, said second group being controlled by said middle-order bit signals, and said third group being controlled by said lower-order bit signals;
- said first group of sources having equal areas and being laid out side-by-side on the chip to form a rectangular region;
- said second group of sources and a part of said third group of sources having equal areas substantially smaller than said first group of sources, and being of number equal to said first group of sources;
- said second group of sources and said part of said third group of sources being arranged side-by-side alongside of said first group of sources and forming a rectangle having a length equal to the length of the rectangle of said first group of sources.

9. Apparatus as claimed in claim 8, wherein said first group of sources consists of 15 sources; and
said second group and said part of said third group consists of 15 sources.

10. Apparatus as claimed in claim 9, wherein said first group of sources have areas of 64X and said second and part of said third group have areas of 4X.

11. An integrated-circuit (IC) chip formed with at least one digital-to-analog converter (DAC) comprising:
- a plurality of current sources;
- at least three groups of switches for controlling said current sources, including:
- a first group of switches operable by a low-order set of input bits for controlling the currents of a corresponding set of said current sources;
- a second group of switches operable by an intermediate-order set of input bits for controlling a corresponding second set of said current sources;
- a third group of switches operable by a high-order set of input bits for controlling a corresponding third set of said current sources;
- said current sources being laid out on said chip in first, second and third groups;
- at least a portion of said first group of sources being controlled by said higher-order bit signals, at least a portion of said second group of sources being controlled by said intermediate-order bit signals;
- said first group of sources having equal areas and being laid out side-by side on the chip;
- said second group of sources having equal areas substantially smaller than said first group of sources, and being of number equal to said first group of sources;
- said second group of sources being arranged side-by-side alongside of said first group of sources and conjointly forming a rectangle.

12. A single MOS integrated circuit (IC) chip containing three digital-to-analog converters (DACs);
- each of said DACs comprising a plurality of current sources, said plurality being disposed on the IC within one small rectangular area, this rectangular area having within it means to apply a single analog bias control signal to the current sources, free of digital control signals;
- said current sources being arranged with individual equal-area conductive elements disposed in a symmetrical pattern on the IC;
- said symmetrical pattern being disposed such that the elements responsive to the lower significant bits of the DAC digital input are at the center of the pattern, and elements responsive to the higher significant bits of the digital input are positioned at increasing distances symmetrically about said center elements.

13. Apparatus as claimed in claim 12, wherein each of said current sources consists of a single MOS device, and each of said DACs includes:
- switch control means comprising for each current source a pair of MOS devices which are operated differentially and are both connected to the corresponding MOS current source and disposed on the IC in close proximity to that current source; and
- said switch control means being arranged in first, second and third groups;
- first, second and third decoder means for said groups respectively;

said first, second and third decoder means being responsive to the higher, middle and lower order bits respectively of the DAC inputs.

14. Apparatus as claimed in claim 13, wherein said middle and lower order bits consist of two and four bits respectively.

15. Apparatus as claimed in claim 13, wherein said higher and lower order bits each consists of four bits.

16. Apparatus as claimed in claim 13, wherein said digital-to-analog converter is a 10-bit DAC;

said set of higher-order bit signals consisting of four bits; said set of middle order bit signals consisting of two bits; and said set of lower-order bit signals consisting of four bits.

17. Apparatus as claimed in claim 13, wherein said first decoder means is a 4:15 decoder to provide for switching any one of 15 current sources.

18. Apparatus as claimed in claim 13, wherein said second decoder means is a 2:3 decoder to provide for switching any 1 of 3 current sources.

19. Apparatus as claimed in claim 12, wherein said current sources are arranged in first, second and third groups, said first group being controlled by said higher-order bit signals, said second group being controlled by said middle-order bit signals, and said third group being controlled by said lower-order bit signals;

the sources of said first group of sources having equal areas and being laid out side-by-side on the chip to form a rectangular region;

the sources of said second group of sources and a part of the sources of said third group of sources having equal areas substantially smaller than the sources of said first group of sources, and being of number equal to said first group of sources;

said second group of sources and said part of said third group of sources being arranged side-by-side alongside of said first group of sources and forming a rectangle having a length equal to the length of the rectangle of said first group of sources.

20. Apparatus as claimed in claim 19, wherein said first group of sources consists of 15 sources; and said second group and said part of said third group consists of 15 sources.

21. Apparatus as claimed in claim 2, wherein said first group of sources have areas of 64X (relative to a unit area 1X) and said second and part of said third group have areas of 4X.

* * * * *